US 11,580,772 B2

(12) United States Patent
Krenzer et al.

(10) Patent No.: US 11,580,772 B2
(45) Date of Patent: Feb. 14, 2023

(54) METHOD AND DEVICE FOR MONITORING A MOBILE INPUT DEVICE

(71) Applicant: JENETRIC GmbH, Jena (DE)

(72) Inventors: Daniel Krenzer, Wutha-Farnroda (DE); Jörg Reinhold, Jena (DE); Philipp Riehl, Jena (DE); Daniel Gläsner, Jena (DE)

(73) Assignee: JENETRIC GmbH, Jena (DE)

( * ) Notice: Subject to any disclaimer, the term of this patent is extended or adjusted under 35 U.S.C. 154(b) by 0 days.

(21) Appl. No.: 17/277,674

(22) PCT Filed: Sep. 5, 2019

(86) PCT No.: PCT/EP2019/073719
§ 371 (c)(1),
(2) Date: Mar. 18, 2021

(87) PCT Pub. No.: WO2020/057993
PCT Pub. Date: Mar. 26, 2020

(65) Prior Publication Data
US 2021/0350105 A1 Nov. 11, 2021

(30) Foreign Application Priority Data

Sep. 18, 2018 (DE) ...................... 10 2018 122 896.1

(51) Int. Cl.
G06V 40/13 (2022.01)
G06V 40/12 (2022.01)

(52) U.S. Cl.
CPC ...... *G06V 40/1318* (2022.01); *G06V 40/1365* (2022.01)

(58) Field of Classification Search
None
See application file for complete search history.

(56) References Cited

U.S. PATENT DOCUMENTS 8,745,490 B2 6/2014 Kim
9,996,728 B2 6/2018 Shah et al.
(Continued)

FOREIGN PATENT DOCUMENTS

| DE | 10 2015 115 381 A1 | 3/2017 |
| DE | 10 2016 114 188 A1 | 2/2018 |
| DE | 10 2017 119 983 B3 | 9/2018 |
| WO | WO 01/69520 A2 | 9/2001 |

OTHER PUBLICATIONS

Feng, Tao, et al., "Touch Panel with Integrated Fingerprint Sensors Based User Identity Management," *2013 IEEE International Conference on Technolosies for Homeland Security (HST)*, Waltham, MA, USA, 2013, doi: 10.1109/THS.2013,6698992 (pp. 154-160).
(Continued)

*Primary Examiner* — Joseph R Haley
(74) *Attorney, Agent, or Firm* — Chrsitensen, Fonder, Dardi & Herbert PLLC

(57) ABSTRACT

A method for monitoring a mobile input device with a screen on which information can be displayed in a first pixel raster of image elements and which comprises a flat optical fingerprint reader and a second pixel raster of light-sensitive sensor elements. A fingerprint and fingerprint characteristics, comprising position of the finger on the screen are detected. The sensor elements detect the light intensity incident on them. The intensity levels are assembled into a static pattern of the fingerprint. The combination of the static pattern and the fingerprint characteristics are compared with a database. If the combination is in the database, a check is carried out whether an action is associated with this combination, which is then carried out, or whether no action is associated with this combination, whereupon a first standard action is carried out. If the combination is not stored, a second standard action is carried out.

23 Claims, 8 Drawing Sheets

(56) References Cited

U.S. PATENT DOCUMENTS

| | | | |
|---|---|---|---|
| 2008/0123908 A1* | 5/2008 | Waldman | G06V 40/1324 |
| | | | 345/82 |
| 2010/0231356 A1 | 9/2010 | Kim | |
| 2011/0285648 A1 | 11/2011 | Simon | |
| 2014/0003678 A1 | 1/2014 | Vieta et al. | |
| 2016/0246396 A1 | 8/2016 | Dickinson et al. | |
| 2017/0132447 A1 | 5/2017 | Reinhold et al. | |
| 2017/0213019 A1* | 7/2017 | Mao | G06F 3/0488 |
| 2017/0257534 A1* | 9/2017 | Huang | G06F 3/042 |
| 2017/0364763 A1* | 12/2017 | Jin | G06F 3/0412 |
| 2018/0032788 A1 | 2/2018 | Krenzer et al. | |
| 2018/0173867 A1 | 6/2018 | De et al. | |
| 2019/0026523 A1* | 1/2019 | Shen | H01L 51/5281 |
| 2019/0065816 A1 | 2/2019 | Reinhold et al. | |
| 2019/0095079 A1* | 3/2019 | Deotale | G06F 3/04842 |

OTHER PUBLICATIONS

Maltoni, Davide, et al., *Handbook of Fingerprint Recognition*, Springer, New York, 2003 (30 pages).

German Patent Office Action for DE 10 2018 122 896.1, dated Aug. 19, 2019 (8 pages).

International Search Report for PCT/EP2019/073719, dated Dec. 9, 2019 (2 pages).

PCT Written Opinion of the International Searching Authority (Translation), for PCT/EP2019/073 719, dated Dec. 9, 2019 (5 pages).

PCT Notification of Transmittal of Translation of the International Preliminary Report on Patentability (PCT/IB/338), dated Apr. 1, 2021 (1 page); PCT International Preliminary Report on Patentability (PCT/IB/373) (6 pages).

\* cited by examiner

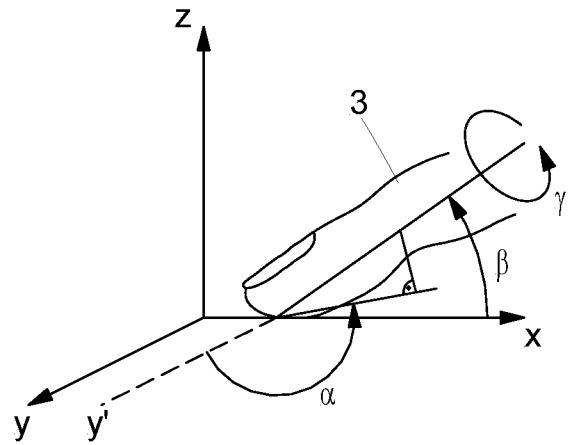
Fig. 2a
| Whorl | Loop | Triangle |
|---|---|---|
| $d_2$ ↗ $d_3$ → ↘$d_4$ <br> $d_1$ ↑ [i,j] ↓$d_5$ <br> ↖$d_0$ ←$d_7$ ↙$d_6$ | $d_2$ ↗ $d_3$ → ↘$d_4$ <br> $d_1$ ↑ [i,j] ↓$d_5$ <br> $d_0$ ↑↓ $d_7$↓ ↓$d_6$ | $d_2$ ↗ $d_3$ ↗ ↑$d_4$ <br> $d_1$ ↗ [i,j] ↖$d_5$ <br> $d_0$ ↗↙ ←$d_7$ ↖$d_6$ |
Fig. 2b
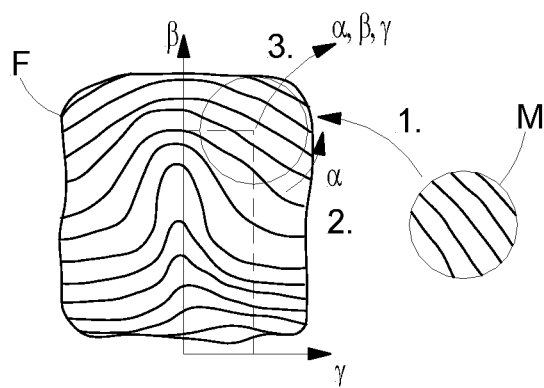
Fig. 3

METHOD AND DEVICE FOR MONITORING A MOBILE INPUT DEVICE

PRIORITY CLAIM

The present application is a National Phase entry of PCT Application No. PCT/EP2019/073719, filed Sep. 5, 2019, which claims priority from German Patent Application 10 2018 122 896.1, filed Sep. 18, 2018, the disclosures of which are hereby incorporated by reference herein in their entirety.

FIELD OF THE INVENTION

The invention relates to a method for monitoring a mobile input device with a screen on which information can be displayed in a first pixel raster of image elements (9), with an integrated flat optical fingerprint reader including at least half of the screen surface area, but preferably a larger share of it, and especially the entire area of the screen surface, and with a second pixel raster of light-sensitive sensor elements. Mobile input devices are understood to include, for example, smartphones, phablets or tablets, but also other, special input devices such as remote control units or, e.g., input devices for controlling smart-home properties or for monitoring devices integrated in smart home systems such as door locks, venetian blinds, domestic appliances, etc., and it should be noted that inputs to these devices can also be made via smartphones.

In such a method, a fingerprint and a number of fingerprint characteristics of at least one finger placed on the screen are ascertained by means of a fingerprint reader in an active application, also known as a program. Fingerprint characteristics include, e.g., the position of the finger on the screen, and optionally a movement pattern of the finger, if the finger is moved across the screen in continuous contact with it. First in this process, the sensor elements record the light intensity incident on them, either once at a specified point of time in a single image, or—if movement patterns are to be ascertained—several times during a specified period in a sequence of images. The intensity levels recorded are then assembled by an image processing algorithm to create a static pattern of the at least one fingerprint and optionally of the movement pattern of the at least one finger. The static pattern corresponds to a fingerprint or a section of it. As the fingerprint reader is a flat element, the position of the finger can be readily ascertained just as a movement pattern can.

DESCRIPTION OF THE PRIOR ART

The identification of fingerprints and/or their characteristics is well described in prior art. Mention should be made especially of D. Maltoni et al., "Handbook of Fingerprint Recognition", Springer-Verlag, 2003, the disclosure of which is expressly referred to herein. Among the features by which the fingerprints of different individuals can be distinguished are, e.g., singularities, —for example, triangular shapes, loops and whorls —, varied forms of minutiae, i.e., striking constellations of the papillary ridges—e.g., crossovers, bifurcations, ends or islands—and sweat pores. The largest singularity, as a rule occurring at the center of the fingerprint, is known as the core singularity. In case this is contained in the portion of the finger placed on the screen, the center point of the core singularity can be taken as the position of the finger on the display. Movement patterns can be ascertained, e.g., by tracking the said center point in a sequence of images.

Once an image of a fingerprint has been recorded, its features need to be extracted from the image data. For this purpose, e.g., an orientation image is generated by subdividing the recorded image of the finger into separate blocks, which are then analyzed separately. In every block that is somewhat greater than a ridge, the local orientation of the ridge, i.e. the angle between the tangent to the ridge and a specified coordinate axis is ascertained. Subsequently, a comparison is made with the results of other blocks to verify the reliability of the analysis. Another approach to the extraction of features from the fingerprint image is to generate a frequency image, which indicates how many ridges of a particular orientation exist in a small local area of the image.

From the orientation image, then, the special, unambiguous characteristics of the fingerprint, i.e., the positions of the minutiae, can, in principle, be ascertained by means of well-known mathematical methods. In addition, also the orientations of the papillary ridges can be ascertained, each in small local environments—so-called blocks—, and be used as characteristics of the fingerprint. From these local orientations, one can, by evaluation of adjoining local environments/blocks, ascertain the abovementioned singularities—e.g. triangular shapes, loops and whorls—that indicate the form of the ridges in an image area consisting of several blocks.

Finally, a comparison is made between the pattern recorded and analyzed in a running application as described above, and patterns in a database. The matching methods used therefore may be, for example, correlation-based—here, images are compared pixel by pixel, and the degree of matching is ascertained—or minutiae-based—here, a comparison is made between the position and the orientation of the minutiae, the latter being determined by a position in a two-dimensional coordinate system and an orientation in the same. Methods based on ridge recognitions can be used as well; here, the comparison is made with regard to frequency, orientation and shape of the ridges.

After ascertainment of the static pattern and the fingerprint characteristics, the combination of the at least one static pattern, the fingerprint characteristics and optionally the at least one movement pattern is compared with a database. Stored in the database are, e.g., —typical for the user of a mobile phone—several fingerprints, ideally together with various fingerprint characteristics and movement patterns. A differentiation of cases is then made, according to whether or not the said combination is stored in the database. If it is, a check is made to verify that, for the active application, a specified action is associated with this combination, which action is then carried out. If no action is associated with this combination, a first standard action is carried out. If the combination is not stored in the database, a second standard action is carried out. The first and the second standard action may also be identical; for example, a user can get a message that no action is associated with his/her input, and/or a sound signal or a vibration signal can be released.

Optical fingerprint readers are known in prior art, including flat fingerprint readers as described, e.g., in DE 10 2015 115 381 A1, and in the as yet unpublished German Patent No. 10 2017 119 983. Also known in prior art is the combination of fingerprint readers with display screens; mobile input devices are described, for example, in US 2010/0231356 A1 and in U.S. Pat. No. 8,745,490 B2, which combine a touch-sensitive sensor with a fingerprint reader and a display screen, where the respective sensors and/or the LCD module implementing the screen are arranged in that order, as seen by a viewer. The method described in U.S. Pat. No. 8,745,490 B2 also opens up the possibility of simultaneously recording a number of fingerprints and releasing actions according to the fingerprints, wherein the fingerprints essentially serve to authenticate the user, their function apart from that corresponding to that of a touch-sensitive sensor, i.e. that the screen displays appropriate touch-sensitive elements with which an action is associated that is carried out if the finger is authenticated. Movements are recorded likewise, e.g., also in U.S. Pat. No. 8,745,490 B2. US 2018/0173867 A1 further describes the combination of fingerprints with various gestures, e.g., with the rotation of a finger on the screen about a rotation axis perpendicular to the screen plane.

The applications known in prior art that combine fingerprint sensors with screen presentations, however, do not go beyond using the fingerprint exclusively for authentication. Once the fingerprint is authenticated, the further processing follows the procedure in case of common touch-sensitive display screens; this applies also to US 2018/0173867 A1, where the ascertainment of the rotation of the finger on the display does not make use of the fingerprint but of supplementary signals of acceleration sensors.

The recognition of the fingerprint, then, only adds a supplementary safety feature to the normal touch-sensitive sensor and the recognition of gestures. Thus, the functionality, compared to the familiar touch-sensitive screens, is enhanced only marginally.

However, there is a multiplicity of applications in which it is desirable that further functions can be assigned to a finger, especially in order to enable more intuitive operation. In an application for free-hand drawing or calligraphy, for example, it is already possible, when drawing with a finger, to control the line thickness by means of pressure-sensitive sensors: the greater the pressure exerted on the sensor from above, the thicker is the brushstroke. In reality, however, the form of the brushstroke can be controlled not only by the force applied, but also, e.g., by the angle between the brush tip and the sheet plane—the screen plane —, or by the angle between the longitudinal axis of the brush and the direction of brush movement.

SUMMARY OF THE INVENTION

Therefore, the problem of the invention is to expand the recognition of fingerprints to the effect that it enables a more variable, refined and, as far as possible, more intuitive control of applications.

In a method of the type mentioned at the start, this problem is solved by ascertaining additional fingerprint characteristics of a finger, viz an orientation of the at least one finger on the screen, by means of an orientation angle $\alpha$, a rotation angle $\gamma$ and/or a setting angle $\beta$ of the at least one finger placed on the screen, i.e. at least one of the said fingerprint characteristics. Together, these three angles, or characteristics, unmistakably define the position of the finger relative to the display plane.

The setting angle $\beta$ means the angle between the first phalanx and the screen plane. If the angle $\beta=0°$, a finger is recorded as lying down flat on the screen; if the angle $\beta=90°$, what is recorded is merely the tip of the finger pulp. The smaller the angle, starting at 90°, the more is visible of the finger pulp, until finally the entire finger is recorded as lying down flat. On the basis of the portion resting on the screen, one can, by means of a comparison with the fingerprint patterns stored in the database, determine at which setting angle the first phalanx is held. Also, the orientation of the finger on the screen can be expressed by an angle relative to a specified axis on the screen, i.e. the orientation angle $\alpha$.

Another fingerprint characteristic is the rotation angle $\gamma$. A finger whose underside rests flatly on the screen corresponds to an assumed plane of the palm that is parallel to the screen plane, enclosing with it a rotation angle of $\gamma=0°$ in this case. To vary the rotation angle, a finger resting flatly on the screen as described above is rotated about its longitudinal axis, which is possible up to an angle of approximately $\gamma=+90°$—e.g. clockwise—or approximately $\gamma=-90°$—e.g. anticlockwise—; both extreme angles correspond to the back of the hand held normal to the screen plane. The rotation angle also takes effect if the finger does not rest flatly on the screen plane. It will always indicate the rotation of the finger about the finger's longitudinal axis, which runs right through the center of the finger, at least of the first phalanx, when the finger is bent.

A third fingerprint characteristic to be ascertained is the orientation of the at least one finger on the screen. On the basis of the static pattern as part of the entire fingerprint, the said orientation can also be ascertained if, e.g., only the finger pulp rests on the screen instead of the whole of the flat finger. By comparison with the entire fingerprint stored in the database, the orientation, i.e. the orientation angle $\alpha$, can then be ascertained.

For the registration of admitted users, one can, in an initializing step, record almost the complete skin impression pattern of the underside of the finger, the sides of the finger and the finger pulp in such a way that the finger is, e.g., rolled about its longitudinal axis on the sensor or the display, and, in addition, the finger pulp is "rolled" over the sensor. These image data can then be assembled to create a contiguous skin impression for those areas that are relevant within the scope of this method. In operation, then, the part of the finger recorded within the scope of operating the device, i.e., a partial skin impression—the static pattern —, can be compared with the assembled skin impression; in this way one can ascertain which part of the finger is resting on the display. From this, the further fingerprint characteristics can be ascertained, namely, the orientation of the finger relative to the screen plane, with the orientation angle $\alpha$, the setting angle $\beta$ relative to the screen plane, and the rotation angle $\gamma$ for lateral rotations about the finger axis, for example, an orientation of $\alpha=20°$, a setting angle of $\beta=45°$, and a rotation angle of $\gamma=+30°$.

Alternatively or additionally, the data stored in the database also include patterns for different setting angles and rotation angles, so that the rotation angle and the setting angle can be ascertained by interpolation, if required. However, this consumes more time and more storage space than the comparison described previously, because the patterns stored require overlap regions, so that parts of the fingerprint pattern have to be stored redundantly, and more arithmetic operations and/or identity checks are required for comparing the stored patterns with the recorded pattern.

In this way it is possible not only to connect a function with a finger itself, but also to connect additional functions with the position in which the finger is held. A change of this position can be used to check control parameters of the respective function.

With particular preference, in the active application, the ascertainment of the fingerprints and the fingerprint characteristics by means of the fingerprint reader is carried out simultaneously for at least two fingers placed on the screen, including also their movement patterns if required. The combination of the at least two static patterns, the fingerprint characteristics and, if required, the movement patterns of the at least two fingers is then compared with a database. In this way, the spectrum of possible functions is further enhanced.

It is expedient in that connection to ascertain the orientation by means of the orientation angle α, the setting angle β and/or the rotation angle γ of one finger in such a way that, first, the static pattern of the fingerprint is ascertained, followed by checking whether the fingerprint is stored in the database. If it is, the rotation angle and/or the setting angle are calculated by way of a comparison of the static pattern with the stored fingerprint or with the stored fingerprint characteristics of the static pattern. The static pattern measured and extracted from the image is only a section of the total recorded fingerprint or skin impression, which is ascertained from rolling the placed-on finger about the rotation axis and the finger pulp, so that the decisive point is which portion of the fingerprints stored corresponds with the static pattern, the measured partial print of the finger. If no fingerprints are stored, the orientation angle α, the rotation angle γ and/or the setting angle β are calculated on the basis of a comparison with statistically obtained fingerprint characteristics stored in the database. If no fingerprint is stored, one can still, by comparison with a biometric sample template, estimate the sizes of the orientation angle α, the rotation angle γ and the setting angle β. Ideally, for this purpose, appropriate data series for various finger sizes are stored in the database to keep potential errors as small as possible. Moreover, a user himself/herself can complete the database by storing a fingerprint pattern—a contiguous skin impression—and corresponding fingerprint characteristics for his/her own fingers. Establishing such a contiguous skin impression can be done by means of suitable inquiry routines of the kind basically known in prior art, e.g. by methods for rolling fingers about their longitudinal axis and the finger tip, or by assembling individually recorded parts of the fingerprint. Such methods are known in prior art, e.g., from DE 10 2016 114 188 A1, which describes the generation of rolling impressions, especially with devices featuring a combination of sensor and display one above the other, or from U.S. Pat. No. 9,996,728 B2, which describes a method for assembling a fingerprint from smaller, individually recorded partial prints. It is also possible, e.g., to use a combination of these or similar methods for generating a contiguous skin impression that contains the finger regions relevant within the scope of the method described herein.

There are various possibilities to configure a screen suitable for performing the method. In one possible embodiment, the second pixel raster with the sensor elements is located above the first pixel raster of image elements. To keep impairment of the luminosity of the screen elements within reasonable limits, the second pixel raster of sensor elements preferably is at least partially transparent. Naturally, the second pixel raster with sensor elements can also be arranged below the first pixel raster of image elements (as seen by a viewer of the screen), in which case the latter is at least partially transparent. This has the advantage that the luminosity of the screen is not impaired. The first pixel raster of image elements can be set up as an OLED, for example. A third possible way is to arrange the first and the second pixel raster in one plane, provided that the screen and the sensor still attain a desired resolution then, which for the sensor should at least be 250 ppi (pixel per inch) to be capable of recording the fingerprints also of children so as to allow their papillary lines to be distinguished. With official applications, the resolution of the sensor should at least be 500 ppi, which allows the features used for identification to be detected much better. To improve the resolution of a recorded fingerprint and, moreover, to reduce the influence of ambient light, a preferred configuration features a layer of angular aperture masks arranged above the light-sensitive sensor elements of the second pixel raster, which restricts the range of the detection angle. Preferably, here, a major part of each light-sensitive sensor element is overlapped by an angular aperture mask, so that angles are recorded only from one side. A further improvement of the resolution is achieved if the angular range recorded from one side is further restricted by the angular aperture mask, so that the light-sensitive element is reached only by light totally reflected by the resting surface. At a transition from a protective glass layer to the ambient air, this can be achieved, e.g., if the angular aperture mask restricts the angular range recorded to angles greater than the critical angle. The critical angle depends on the material combination: for transitions from glass to air, it is, e.g., between 40° and 43° depending the glass type; for transitions from ceramics to air it is between 33° and 36° depending on the ceramic. This restriction of the angular ranges by means of an angular aperture mask can be carried out in the horizontal and vertical directions. In this way, the influence of horizontal and vertical divergence of the illuminating light is diminished; as a result, thicker surface layers can be used with undiminished resolution, e.g., to improve the protection of the screen.

In the simplest case, illumination in fingerprint recording is by the image elements; this can be implemented especially if the first pixel raster of image elements is arranged below the second pixel raster of light-sensitive sensor elements. In this way, the number of components is restricted, the display can be made relatively thin, and production costs can be kept low.

In another embodiment that enables fingerprints to be recorded with higher accuracy, illumination for fingerprint recording is by light coupled into a plate-shaped light guide that is arranged above or below the second pixel raster and has light outcoupling elements arranged, or shaped, on its large surfaces. Typical thicknesses of a plate-shaped light guide are between 25 μm and 5 mm, the thickness preferred for mobile input devices being 0.05 mm. Here, the light is coupled in at such an angle that, in a plain plate-shaped configuration of the light guide without light outcoupling elements, the light will be propagated in the said light guide only by total reflection, i.e., it could leave the light guide at the edges, i.e., the narrow end faces only. By means of the light outcoupling elements, which can be prism-shaped, for example, light is coupled out of the light guide, undergoes a change of direction, and leaves the light guide in the direction of a resting surface at an angle within a specified range of, e.g., ±71° relative to the screen's surface normal. The illuminating light then penetrates both the transparent region of the sensor layer and a cover layer, the said two layers being joined by a layer of an adhesive that is transparent to the light being used. At the interface between the cover layer and air, on which the light is incident at an angle of approximately 60°, another total reflection takes place, and the illuminating light is reflected back in the direction of the sensor layer, where it is detected by the light-sensitive elements of the sensor layer. If skin with skin ridges and skin valleys rests on the resting surface, total internal reflection (TIR) at the site of the resting skin areas is impaired, and illuminating light is coupled out. In this way, a contrast between skin valleys and skin ridges is imaged, since, on the sites of the valleys, the light continues to be totally reflected, so that the valleys look brighter in the image. The use of an illumination as described above, which is precisely defined with regard to the angle of outcoupling from the light guide, makes it possible to utilize very narrow angular ranges that are, as a whole, restricted due to the total reflection. This results in fingerprint records of very high resolution and rich in contrast, even though the sensor surface and the resting surface—e.g., due to additional protective layers between sensor and finger—are located at a greater distance from each other than it would be possible with diffuse illumination, because, with diffuse illumination, and without restriction of the light direction recorded, focused images can only be created if sensor plane and finger are arranged at a closer distance from each other than the distance between the center points of adjacent sensor pixels, with image definition increasing with closer distances.

In yet another embodiment, the placing of a finger is detected by means of a touch-sensitive layer, which is a preferred feature of the screen. Only subsequently, a record by means of the fingerprint reader is released. In this way, energy can be saved, especially if the fingerprint reader is operated with an additional light source for recording the fingerprints and the fingerprint characteristics as described above. Moreover, the use of a touch sensor layer offers another advantage: The touch sensor already ascertains the position of the finger, i.e., the location and the surface area of the finger portion in contact with the screen. Ascertaining the fingerprint by means of the sensor layer and/or the analysis of the recorded signals can then be restricted to this two-dimensional region. Thanks to this restriction of the analysis, the computing effort in analyzing the sensor image can be reduced on the one hand, and fingerprint detection becomes more robust on the other.

Below, advantageous embodiments of the method are described, parts of which refer to specific applications.

Basic functions of these embodiments are used for the authentication of inputs. In a preferred embodiment of the method, the use of the screen as an input device, or the use of an application or of selected functions therein is enabled only if the combination of static patterns, optionally of the movement patterns, and at least part of the fingerprint characteristics is stored in the database and linked to an enable function. In this embodiment it is necessary that at least two fingers are placed on the screen. The added inquiry of at least one further fingerprint, i.e. the at least one second fingerprint, and the fingerprint characteristics concerned, increases security. For example, before the use of a banking application is enabled, the user can be required to place the thumb of the left hand at a setting angle of 0°, and the index finger of the right hand at a setting angle of 90°, in specified positions on the screen, which positions can be indicated. The indication can be designed in such a way that it only illuminates certain fields of the screen without telling the user which of the fingers is to be placed on the screen and in what way; this can be laid down by the user in the respective application.

For such authentication it is a prerequisite that the combination of the static patterns and of the at least part of the fingerprint characteristics is stored in the database. For that purpose, the mobile input device needs to be initialized or trained, i.e., the fingerprints of the user to be authenticated have to be stored in the database as completely as possible in the form of skin impressions. This is done with the methods mentioned at the start, in which, e.g., the finger is placed on a screen, then rolled through the rotation angle to either side as far as possible, with the finger pulp being rolled in addition.

Preferably, the fingerprint characteristics required for enabling are stored directly by the user, but can also be extracted from the fingerprint stored during initialization, stating the angular positions, and compared with the static pattern recorded.

In another preferred embodiment, in which also at least two fingers are simultaneously placed on the screen, for a combination of static patterns, fingerprint characteristics and optionally movement patterns, before a check whether a specific action is associated with this combination, it is checked whether a first of the at least two static patterns corresponds to an activation pattern for activating a multi-fingerprint recording. Only if this is the case will the further check and optionally the release of an action take place. For example, a left-hander may be required to place his/her right thumb at a setting angle of about 45°—with the possibility of stating error tolerances—as an activation pattern. This mode of multi-fingerprint recording after activation prevents inputs being made by mistake on the one hand, and, on the other hand, enables the execution of more or less complex, but frequently used actions with few fingers or finger positions.

Such an application may, for example, be a text input function. The first of the at least two static patterns, then, corresponds to the activation pattern, and, according to a second one of the static patterns, is set as a typing mode, e.g., lower case letters, upper case letters, numbers or special characters. Each of the modes can be associated with a specified finger of a hand; switching between upper-case and lower-case letters can also be combined with different setting angles of one and the same finger, which can be checked during the input, so that, e.g., with a setting angle greater than 70°, the respective letter is written as an upper-case letter, or, with a smaller setting angle, as a lower-case letter.

In another example, in which the first of the at least two static patterns corresponds to the activation pattern, the functions of a computer mouse can be emulated according to a second, and optionally further ones, of the static patterns, with preferably one finger each being assigned to a button or a scroll element of the computer mouse. According to the element emulated, further fingerprint characteristics or movement patterns can be assigned to particular functions. For example, the finger that is assigned the function of the scroll wheel can also take on the scrolling function, e.g., in connection with a search function, in such manner that, e.g., scrolling in one direction is assigned an upward sliding movement of the finger on the screen, and scrolling in the other direction is assigned a downward sliding of the finger on the screen.

For many applications, if the first of the at least two static patterns corresponds to the activation pattern, zoom and marking functions can be carried out according to a second one of the static patterns. In an internet browser, for example, zoom functions can be implemented by suitable movement patterns of a finger, e.g., the middle finger; text can be marked if another finger, e.g. the ring finger, slides along the respective text passage if the first activation pattern has been recorded once or is being recorded continuously.

In yet another embodiment, in which the first of the at least two static patterns corresponds to the activation pattern, a multiple assignment of an input element is implemented by different second static patterns, each of which corresponds to another finger. Here, the term "input element" means an element presented on the screen, e.g., a folder, or an icon of some other application. So far, the common way of implementing this is by different durations, or different pressures, of touching the input element, the results of which are frequently unsatisfactory in practice, as it involves a lot of time, and/or the differentiation of pressures is working less than exactly. The mode of copying text or graphic elements proposed here is faster, more reliable and more convenient than the method used so far, in which, for marking, the touch screen is pressed for about 1 second, after which the element touched by the finger is marked, and subsequently the front and rear boundaries of the marked region can be varied to mark more or less of the content, whereas the distinction of the fingers by the fingerprint allows different functions to be distinguished quickly and precisely, which is quite some gain during inputs by, or interaction with, the user. Herein, multiple assignment of an input element can be implemented not only by using different second static patterns but also by a single second static pattern that corresponds to a fingerprint, with the different assignments then corresponding to different orientations, setting angles and/or rotation angles in the fingerprint characteristics.

The procedure described above can also be used for authentication with particularly high security. If the first of the at least two static patterns corresponds to the activation pattern, the authentication process is only started according to at least one second static pattern. Preferably, the authentication process is started only if the fingerprint characteristics and/or a movement pattern of the at least one second static pattern correspond to specified values.

A somewhat simplified method of authentication working with one finger can do without inquiry of the activation pattern and only checks, for a static pattern, whether the fingerprint characteristics and/or a movement pattern correspond to specified values.

In addition, a multiplicity of applications are possible in which one can do without checking the activation pattern. For example, a switch provided in the basic settings of the mobile device can allow multi-finger recording if this has been enabled in the settings for the respective application. Likewise, the first static pattern, i.e., the activation pattern, can be input at the outset in order to start the multi-fingerprint recording mode, which then will operate until the first of the two static patterns is recorded a second time, optionally at a screen location intended therefore.

Further, many applications are conceivable that can do without a separate activation of the multi-finger recording mode, wherein a functionality enhancement results already from the fact that, besides the fingerprint and, optionally, the movement pattern, the other fingerprint characteristics, i.e., orientation, rotation angle or setting angle are recorded.

For example, a change of the setting angle or rotation angle of the at least one finger in the active application may vary the sound volume, or the size of a section from a two- or three-dimensional graphic representation. This can be used, e.g., in musical composition applications of higher complexity, in which a number of controls act on different effects, with each control being assigned to a finger; e.g., the setting angle of the finger can be used to adjust the sound volume of the effect—e.g., of a particular instrument —, a change of volume being achieved by variation of the setting angle; a finger placed flatly on the screen may correspond, e.g., to muting.

The change of the size of a section from a two- or three-dimensional graphic representation by means of changing the setting angle or rotation angle is applicable with particular benefit, e.g., in navigation applications. Also, the change of the setting angle of the at least one finger can be used to switch between a two- and a three-dimensional presentation of an object. The finger used therefore may be a different one than the finger implementing the zoom function.

In a particularly preferable embodiment, a change of the setting angle of the at least one finger in the active application changes the setting angle of an actual or emulated writing tool for the screen. The setting angle of an actual writing tool, e.g. a touch pen, is then determined according to the setting angle of the finger, no matter at which angle the pen is held relative to the screen surface. In this way, one can improve the function of touch pens, which commonly can vary a line thickness only by way of varying the pressure exerted on the screen. The result is even better if the finger itself is used to emulate the writing tool.

The change of orientation of the at least one finger in the active application can also be used for control. For example, an object presented on the screen can be rotated, or, in another application, the orientation of an emulated proper writing tool for the screen can be varied. If, for example, a paint brush is emulated by a finger, the direction of the brush can, in this way, be defined in addition to its setting angle, so that the user-friendliness of, e.g., calligraphic applications is improved.

Finally, the security of an authentication process with one finger can be improved if the initialization of the authentication process takes place only if the static patterns determined by means of the fingerprint reader each have at least two specified fingerprint characteristics—e.g., setting angle and orientation—and/or if the two static patterns determined at a specified time interval reflect changes in at least two fingerprint characteristics in a specified way—for example, the rolling of a finger, or the variation of the setting angle of a finger in a specified way, wherein direction changes can also be taken into account. Alternatively or in addition, the initialization of the authentication process may take place only if the movement patterns determined by means of the fingerprint reader correspond to specified movement patterns.

It is understood that the features mentioned before and those to be explained below can be applied not only in the combinations stated but also in other combinations or as stand-alone features without exceeding the scope of the present invention.

BRIEF DESCRIPTION OF THE DRAWINGS

Below, the invention will be explained in more detail and exemplified with reference to the accompanying drawings, which also show features essential to the invention, among others, and in which FIGS. 1a, b are flow charts for a method for monitoring a mobile input device, FIGS. 2a, b illustrate the parametrization of the finger position and of the fingerprint pattern, FIG. 3 illustrates the comparison of a static pattern with a fingerprint.

DETAILED DESCRIPTION OF THE DRAWINGS

Figure 1A:
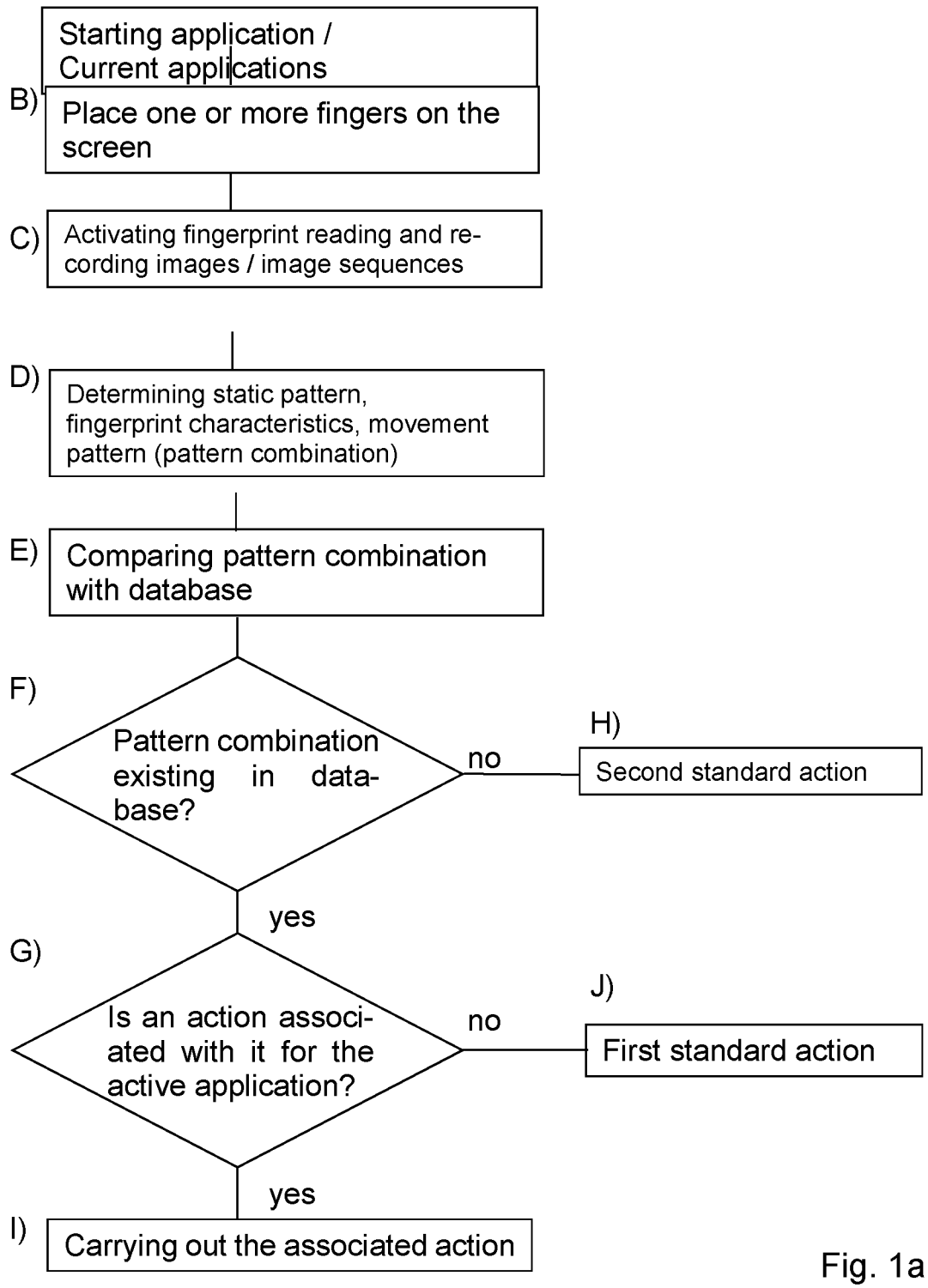

First of all, FIG. 1 is the flow chart of a method for monitoring a mobile input device with a screen, on which information can be presented in a first pixel raster of image elements, and in which a planar optical fingerprint reader with a second pixel raster of light-sensitive sensor elements is integrated, which covers at least half of the screen surface. The structural configuration of the mobile input device will be explained in detail in connection with FIGS. 4-6.

For the sequence of operations of the method it is first necessary that an application is started, either by the user or by the operating system, or that an application is already running. The term "application" is understood to include programs that have to be started by a user as well as applications started by the operating system. The former kind includes, e.g., e-mail programs, word processors, games, etc.; applications started by the operating system include, e.g., the screen management, which superimposes various symbols known as icons on the screen of the mobile input device; the applications symbolized by them are commonly started by touching them. The prerequisite that an application is started or already running is marked by A) in FIG. 1a. In step B), a finger, or several fingers is/are placed on the screen. In step C), fingerprint reading is activated, and images or image sequences are recorded by means of the fingerprint reader. In the active application, the fingerprint and several fingerprint characteristics are ascertained by the fingerprint reader for at least one finger placed on the screen. The fingerprint characteristics include the position of the finger on the screen, the orientation of the at least one finger on the screen, and the rotation angle and/or the setting angle of the at least one finger on the screen. If the at least one finger is moved, a movement pattern is recorded in addition. The recording is carried out in such a way that the sensor elements detect the light intensity incident on them, either once at a specified time in one image, or several times during a specified period in an image sequence. For determining the position of the finger, it is generally possible to ascertain the center of mass of the static pattern of the finger region resting on the screen, or alternatively, as described above, the center of the core singularity. The movement pattern results from tracking the position of the finger across a sequence of successive images.

In step D), an image processing algorithm assembles the intensity values recorded, thus creating a static pattern of the at least one fingerprint; this static pattern corresponds to a section of the entire fingerprint itself. Unless the fingerprint characteristics could be ascertained during recording by means of the fingerprint reader, which is the case for finger position, the remaining fingerprint characteristics, e.g., the setting angle or the rotation angle, are ascertained in the course of image processing. Where required, movement patterns are ascertained as well.

In step E), finally, the combination of the static pattern of the at least one finger, i.e., of the section of the entire fingerprint, the fingerprint characteristics and, where required, the movement pattern are compared with a database. This is step F) in FIG. 1a. If the combination described is stored in the database, step G) is performed, and a check is made as to whether, for the active application, a specified action is associated with this combination, which will then be carried out; this corresponds to step I). If, whereas the said combination has been stored in the database, it lacks an action associated with it in the active application, a first standard action will be performed, which is step J) in FIG. 1a. If the combination itself is not stored in the database, a second standard action will be performed, being step H) in FIG. 1a. The first and the second standard action may also be identical and, e.g. display an error message indicating that no input is associated with this action.

Figure 1B:
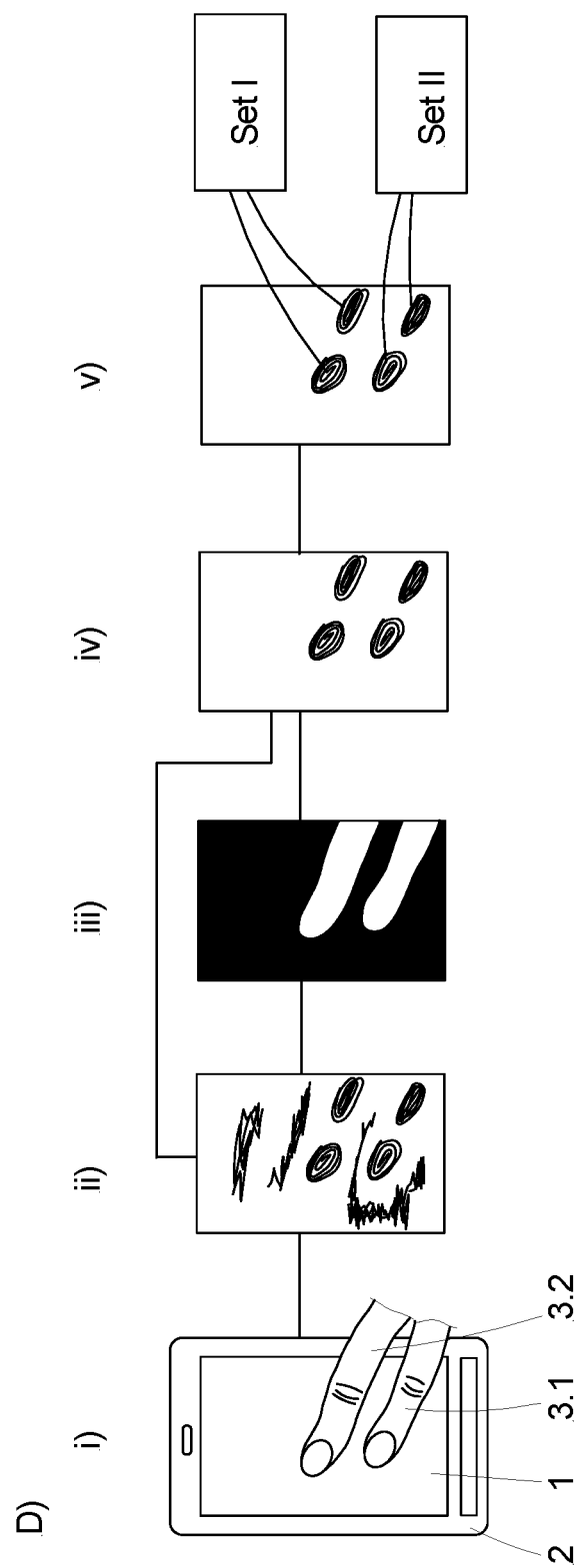

FIG. 1b explains step D) of FIG. 1a in more detail. Step i) shows the initial situation with fingers 3 (here, two fingers 3.1 and 3.2) placed on a screen 1 of a mobile input device 2. The fingerprint reader first records a gray-scale image; a differentiation by colors is unnecessary, because what matters is only the contrast between the skin ridges and skin valleys of the fingerprints. From the gray-scale image shown in step ii), a binary mask image is generated, which is shown in step iii). The mask is used for filtering: Only the intensity values recorded within the white area of the binary mask image shown in step iii) are taken into account; the result is the adjusted gray-level image shown in step iv). Ascertained from this in the further course, as shown in step v) of FIG. 1b and described above, are the static patterns of the fingers, i.e., the sections of the whole fingerprints, and the other fingerprint characteristics such as position, orientation—strictly speaking, orientation angle $\alpha$, —setting angle $\beta$ and/or rotation angle $\gamma$, and these data are stored in appropriate data structures for further processing.

As exemplified in FIG. 1b, the fingerprints—strictly speaking, their static patterns, fingerprint characteristics and, where required, movement patterns—are, in the active application, ascertained by the fingerprint reader simultaneously for at least two fingers placed on the screen; these data are then compared with the database. For implementing the method and the extension of the monitoring facilities as compared with conventional mobile input devices, the ascertainment of the print characteristics of just one finger is sufficient. Whereas the position and—with a finger resting flatly—also the orientation of the finger or fingers readily result from the image recorded, this is not the case for setting angle $\beta$ and rotation angle $\gamma$. To ascertain these, at first the static pattern of the finger is ascertained, with a check whether the fingerprint is stored in the database. If it is, the static pattern is compared with the fingerprint pattern stored and, thus, also with the fingerprint characteristics belonging to the fingerprint stored and derivable therefrom, the said comparison serving to determine the orientation, the rotation angle $\gamma$ and/or the setting angle $\beta$ by numerical calculation. This can be done in such a way that, e.g., for an initialization, images of the finger are recorded in advance at different rotation angles and/or setting angles, but better by way of recording a whole fingerprint as described above, e.g., by rolling the finger and the finger pulp on the screen. If the fingerprint is not stored, the rotation angle and the setting angle can be calculated nevertheless by a comparison with statistical, averaged fingerprint characteristics stored in the database.

Let this approach be explained in more detail with the help of FIGS. 2a, b and FIG. 3. FIG. 2a shows a finger 3 placed on a screen. Here, the screen, in which a fingerprint reader is integrated, is located in the plane spanned by x and y in a Cartesian coordinate system; thus, the direction z corresponds to the normal to the screen. The position of the finger on the screen can be described by its orientation, the setting angle and the rotation angle. The orientation is given relative to a specified axis in the screen plane; in the example shown in FIG. 2a it is given by an orientation angle $\alpha$ in the screen plane, measured relative to an axis y' parallel to the y-axis. The setting angle β expresses how much the first phalanx of the finger 3 is inclined relative to the screen plane and is measured with reference to the same. The rotation angle γ describes the rotation of the finger 3 about its longitudinal axis. If this rotation is carried out on the screen, this is referred to as "rolling" of the finger 3. Taken together, the three angles unambiguously describe the position or attitude of the respective finger relative to the screen; in principle, any 3-tuple of values can be assigned a function; it should be considered, though, that especially the setting angle β and the rotation angle γ can only be determined with relatively wide error margins, because the resting force can influence the size of the static pattern. If the resting force is recorded in addition, these margins can be narrowed down.

In addition, the orientations of the fingerprint ridges can be ascertained in small local environments—so-called blocks—and used as characteristics of the fingerprint; this is shown by FIG. 2b. From these local orientations—designated $d_0 \ldots d_7$ in FIG. 2b, with i and j designating indices of a matrix/of a block—one can, by analyzing adjacent local environments/blocks, ascertain the singularities mentioned above—e.g., whorls, loops and triangular forms, shown as examples in FIG. 2b—, which reveal the form of the ridges in an image region consisting of a number of blocks.

FIG. 3 shows the comparison of a static pattern M with a whole fingerprint F stored in the database. The whole fingerprint—as a rule, only of the first phalanx of one finger—is recorded in the way described above by rolling the flat finger on the fingerprint reader and rolling the finger pulp; therefore, this is a pattern of a relatively large area that in a rough approximation is rectangular, as a rule. A static pattern M recorded by the fingerprint reader represents the part of the whole fingerprint that is currently resting on the display. The ascertainment of the fingerprint and its characteristics or features is carried out as known in prior art and described at the outset. For this purpose, a comparison is made first to find out to which of the whole fingerprints stored it belongs. If this whole fingerprint F exists and has been found, as shown in the example of FIG. 3, the orientation angle α, the rotation angle γ and the setting angle β are calculated on the basis of a pattern comparison, i.e., the section of the whole fingerprint F that corresponds to the static pattern M is identified. As also explained at the outset and known in prior art, the comparison can include the correlation, minutiae, the orientation image, a frequency image, or the shape of the ridges. The position of, e.g., the centroid of the static pattern M in the whole fingerprint F defines the setting angle β and the rotation angle γ; the rotation of the static pattern M relative to the whole fingerprint F defines the orientation angle α. In the example shown, the position of the center of the static pattern M (here, circular) in a coordinate system spanned by the rotation angle γ and the setting angle β corresponds to the respective values that can be assigned to the static pattern M. Here, the error margin for the setting angle β is larger, as its ascertainment varies with the resting force and, therefore, may be less accurate. For ascertaining the setting angle β and the rotation angle γ, it is advantageous to resort also to the shape and size of the static pattern M; wherein, e.g., with a smallish setting angle, the pattern M tends to be largish and of an oblong shape. For individual anatomic reasons, however, the size and shape of the pattern M cannot be used with all fingers or all persons.

Figure 4A:
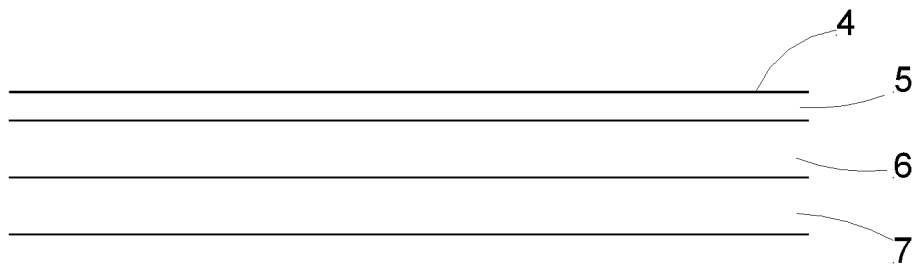
FIGS. 4a-c illustrate diverse embodiments of a screen in a mobile input device.
Figure 4B:
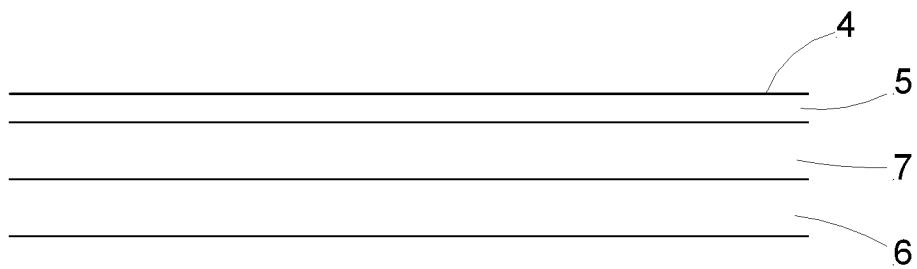
Figure 4C:
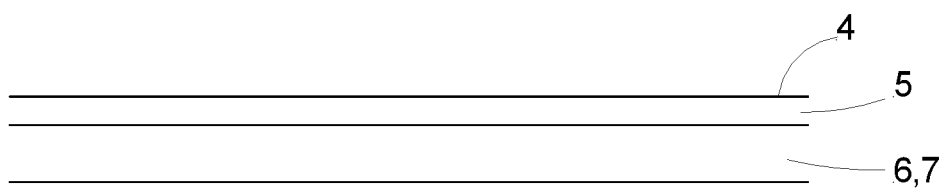

With the help of FIGS. 4-6, various possibilities of implementing a screen in the form of a layer stack for a mobile input device will now be described. With FIGS. 4a-4c, first, the general structure of such a layer stack is briefly explained. In the direction of a user, the layer stack is limited by a resting surface 4. This, in turn, is part of a protective layer 5 for protecting the pixel rasters of image elements and sensor elements. In FIG. 4a, a sensor layer 6, which contains the second pixel raster of light-sensitive sensor elements, is arranged below the protective layer 5, but above a display layer 7, into which the first pixel raster of image elements is integrated. In FIG. 4b, the sensor layer 6 is arranged below the display layer 7. In FIG. 4c, the sensor layer 6 and the display layer 7 are identical; here, the sensor elements and the image elements are arranged side by side. In the embodiments shown by FIGS. 4a-4c, the illumination used for recording the fingerprints is provided by the screen elements of the display layer 7, which can be, e.g., an OLED layer. In case the display layer 7 is arranged above the sensor layer, the image elements need to be transparent to light, so that part of the light directed back into the protective layer 5 by the fingers can hit the sensor elements. In concrete terms, placement of one finger on the display or screen always means placement of the finger on the topmost, accessible layer of the layer stack, i.e., on the resting surface 4.

The layers are joined to each other by transparent adhesives, which are not shown in the drawings. Furthermore, a layer of angular aperture masks (not shown either) can be arranged above the second pixel raster to limit the range of the detection angle of the sensor elements.

Figure 5A:
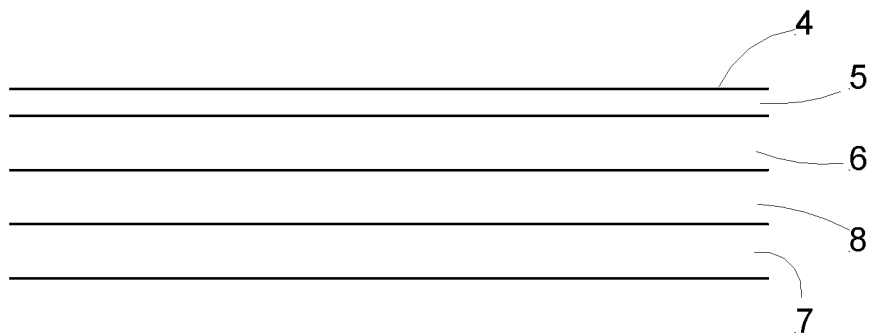
FIGS. 5a-d illustrate further embodiments of such a screen.
Figure 5B:
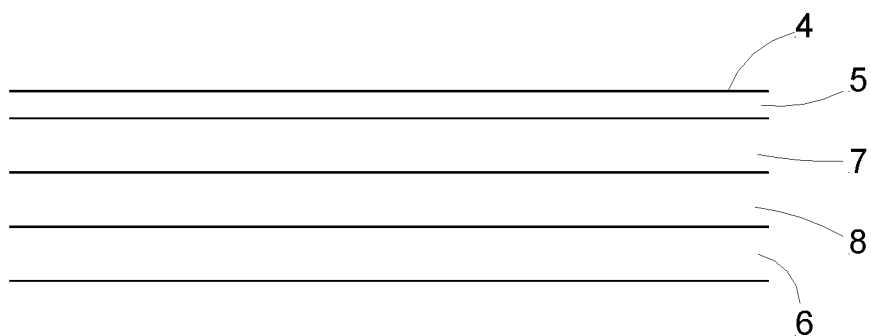
Figure 5C:
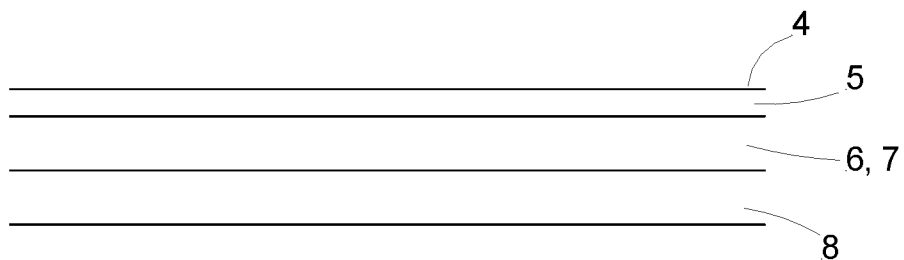
Figure 5D:
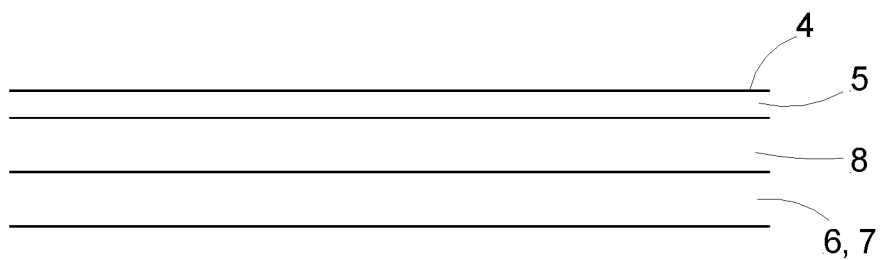

In another preferred embodiment, which can also be combined with the layer of angular aperture masks, the illumination for recording the fingerprints is provided by light coupled into a plate-shaped light guide that is arranged above or below the second pixel raster, and the large surfaces of which have light outcoupling elements disposed or shaped on them. Via the light outcoupling elements, the light is coupled out in the direction of the resting surface 4 for the fingers 3 and totally reflected there, unless any skin papillae of a finger are resting on the resting surface 4. Embodiments of this type are shown in FIGS. 5a-5d, where the plate-shaped light guide is symbolized by a luminous layer 8; light is coupled into the light guide laterally through one of its edges. In FIG. 5a, the luminous layer 8 is arranged below the sensor layer 6 with the second pixel raster with sensor elements, but above the display layer 7 with the first pixel raster with image elements. FIG. 5b shows an embodiment in which the luminous layer 8 is arranged between the sensor layer 6 and the display layer 7, with the sensor layer 6 being arranged below the luminous layer 8 as seen in the direction of a viewer. As the light is totally reflected within the luminous layer 8 and can only leave it via the light outcoupling elements (not shown here), the luminous layer 8 may also be arranged above the sensor layer 6 without interfering with the sensitivity of the light-sensitive sensor elements, and no detrimental brightening will take place. FIG. 5c shows another embodiment, in which the two pixel rasters are combined to form a common layer of sensor elements and image elements, and in which the luminous layer 8 is arranged below this common layer. FIG. 5d, finally, shows the common sensor-and-display layer 6, 7 and the luminous layer 8 arranged in an inverted order, with the luminous layer 8 located above the combined sensor-and-display layer 6, 7.

Figure 6:
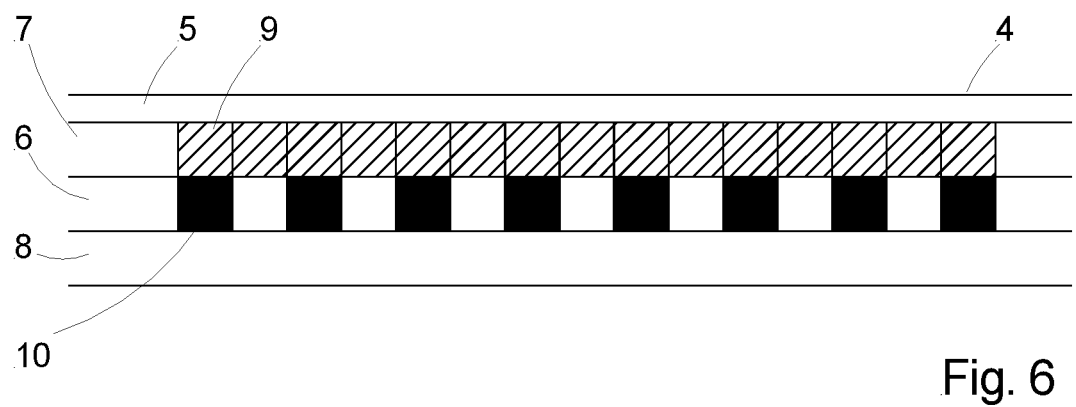
FIG. 6 illustrates an alternative embodiment of a screen in detail.

FIG. 6 is a detailed presentation of the embodiment shown in FIG. 5c. Here, the sensor layer 6 and the display layer 7 are arranged directly one above the other to form one common layer. Transparent screen elements 9 are arranged above sensor elements 10, which need not necessarily be transparent. The resolution of the second pixel raster of sensor elements 10 is lower than that of the first pixel raster of image elements 9; light from the luminous layer 8 can, after having been coupled out, penetrate upwards through the gaps between the sensor elements 10. Moreover, it is also possible, deviating from the embodiment shown in this FIG. 6, to arrange the sensor elements 10 and the screen elements 9 in one plane.

Further, the screen formed by the layer stack can additionally be equipped with a touch-sensitive layer (not shown here), which senses the placement of a finger and releases a recording by means of the fingerprint reader.

Figure 7:
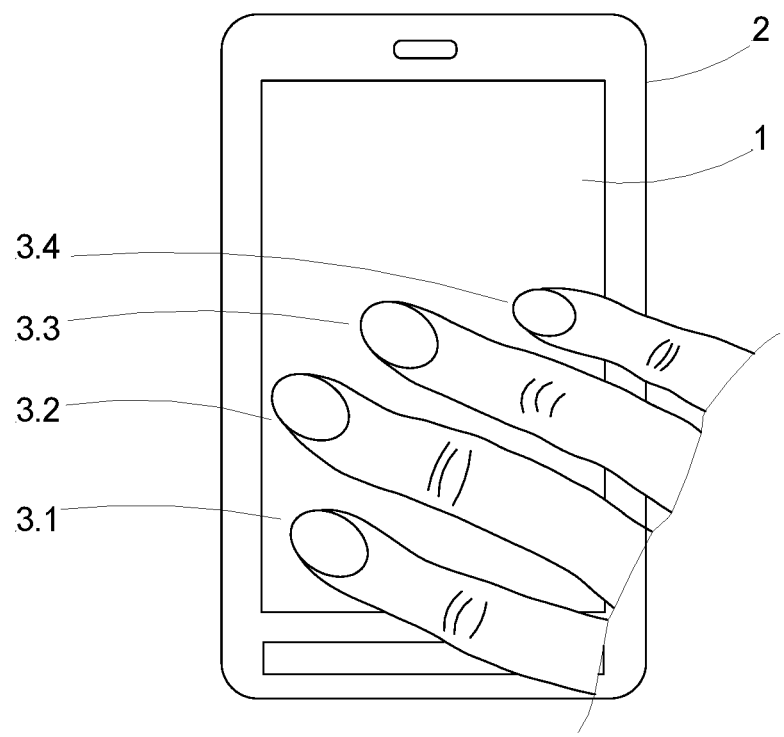
FIGS. 7-9 illustrate various possible ways of operation.
Figure 8:
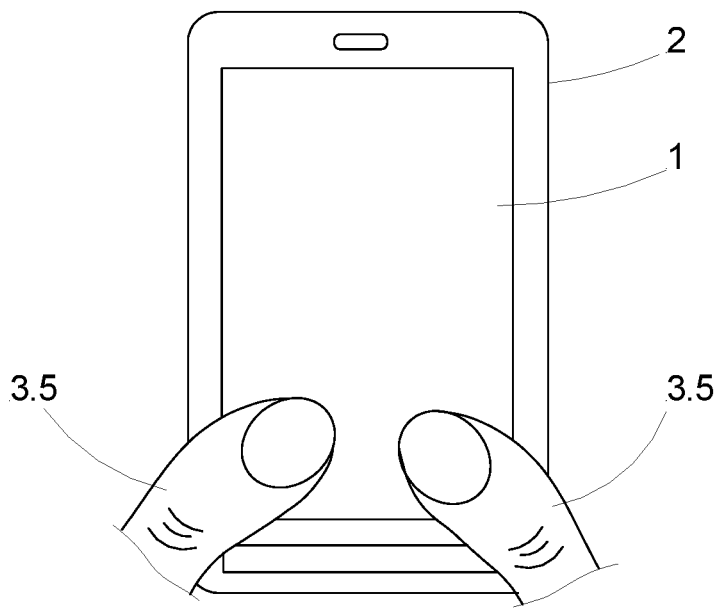
Figure 9:
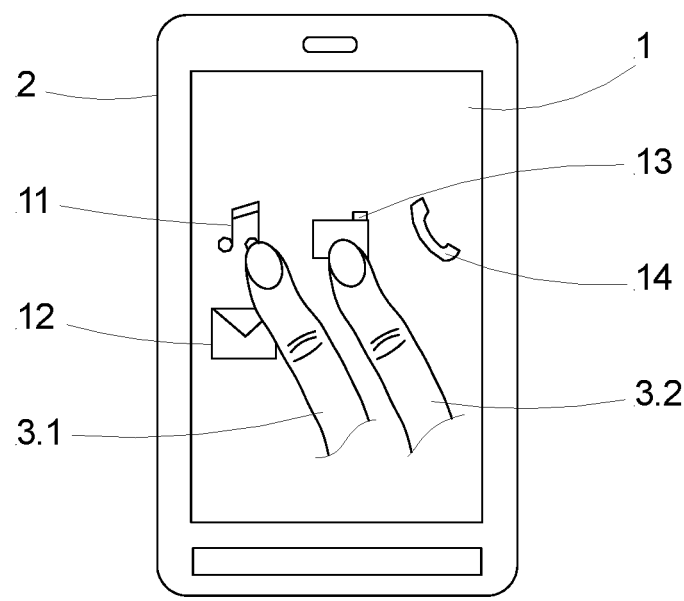

Thanks to the recording of additional fingerprint characteristics, there results a multiplicity of different possible uses, which also comprise extensions of existing programs. FIGS. 7-9 show examples of varied applications using the method described above. FIG. 7, e.g., shows an application in which four fingers of the right hand 3.1, 3.2, 3.3 and 3.4 are placed on the screen, and an application is started only, or permission for an action carried out by the application, e.g., an online money transfer, is enabled only if the fingerprints—i.e., the static patterns and, if required, further fingerprint characteristics such as position, rotation angle and setting angle—correspond to a pattern combination stored in the database. One can specify, for example, that the use of the screen as an input device, or the use of an application or a selected function in this application, is enabled only if the combination of the static patterns and at least part of the fingerprint characteristics is stored in the database and combined with an enable function.

In another embodiment of the method, concerning a combination of static patterns, fingerprint characteristics and, if required, movement patterns, a check whether a specified action is associated with this combination, is preceded by a check whether a first of the at least two static patterns corresponds to a specified activation pattern for activating a multi-fingerprint recording, and only if this is the case will the further checking and, if required, the release of an action be carried out. This is indicated in FIG. 8, for example. Here, the thumbs 3.5 of the left and the right hand are placed on the screen 1 of the mobile input device 2. For a right-hander, e.g., the left thumb print may be set as the activation pattern—with the addition, if required, of position, setting and/or rotation angle and orientation. In this case, multi-fingerprint registration will be enabled, and certain functions will be implemented depending on which finger or fingers of the right hand is/are placed on the screen and, if of interest, in what position. If the application active in FIG. 8 is, e.g., a word processing program, and if a text input function is activated, the fingers of the right hand can be assigned to a typing mode; for example, the thumb can be assigned to lower case letters, the index finger to upper case letters, another finger to numbers, and a fourth finger to special characters, so that, if one of these fingers is placed on the screen in addition to the thumb of the left hand, the respective typing mode assigned to that finger will be set. For easier identification, the screen will, in addition, preferably display an appropriate keyboard, each key of which having multiple assignments in the manner described. The currently active mode can be highlighted. To simplify matters, the method can also be carried out in such a way that the activation pattern needs to be recognized only once, so that, in this example, the thumb of the left hand need not remain in place on the screen 1 until the application is closed, but a change of the typing mode is carried out with the fingers of the right hand alone. Likewise in this way, the fingers can be assigned the functions of a computer mouse, with one finger each being assigned to a button or a scroll element of the computer mouse, for example, the middle finger to the scroll wheel, the ring finger to the right mouse button, and the index finger to the left mouse button. Within the word processing program or on a website, the right thumb or any other finger of the right hand can be assigned various zoom or marking functions, which are carried out then; the thumb of the right hand, which verifies the activation pattern, is not taken into account for these actions; i.e., it is not assigned any such function.

With the method described, it is also possible to implement multiple assignments of different second static patterns to an input element, each of which corresponding to a different finger. This is exemplified in FIG. 9. Here, four different application examples 11-14 are symbolized: a music application 11, an e-mail application 12, a folder application 13, and a telephone application 14. If, e.g., the index finger 3.1 is placed on application 11, this application can be opened, and a selection of playable pieces of music is displayed. If, on the other hand, the middle finger 3.2 is placed on the music application 11, this finger may, for example, be associated with switching between the "Play" and "Pause" functions. These functions may also be implemented without any activation by recognition of an activation pattern, for example, by a global or application-specific setting. Multiple assignment, in this case, is implemented by associating different functions according to the fingerprint for the music application 11, if its symbol is presented on the screen 1. Alternatively or additionally, multiple assignment of an input element can also be implemented by different orientations, setting angles and/or rotation angles in the fingerprint characteristics. For example, the functions "Fast forward" and "Fast rewind" can be implemented with different rotation angles of a finger, preferably the index finger, wherein the rotation angles should have opposite signs. Fast forward would then correspond to a positive rotation angle, i.e. to an index finger inclined to the right, whereas fast rewinding would be released by an index finger rolled to the left.

The change of the setting angle of the index finger, then, can be used, e.g., for controlling the volume. Volume control, however, may also be assigned to another finger, whether additionally or alternatively.

In music-mixing applications, in which music or audio signals are mixed or tuned, it is common for the screen to present slide controls and rotary controls. The setting of a slide control can be effected, e.g., by adjusting the setting angle of a finger associated with this slide control, whereas for rotary controls this can be connected with the orientation of the respective finger. A variety of slide controls can serve to tune trebles, middles and basses, or also the fading over of audio files. With multi-fingerprint-based input as described above, one can, e.g., use the fingers of one hand to determine an input category such as, e.g., the volume, and use the fingers of the other hand to control the volumes of the individual channels, with the advantage that one need not necessarily look at the screen, because the setting of the fingers lets one intuitively identify the setting range or the value adjusted. A finger resting flat on the screen, e.g., may produce minimum volume, whereas a finger propped up on the tip results in maximum volume.

The multi-fingerprint input mode can also be used for navigating applications. To avoid unwanted actions, it can be made a prerequisite that first a multi-fingerprint input mode is activated by placing a particular finger on the screen, so that at least one of the static patterns corresponds to the activation pattern. The setting of the setting angle can be used, e.g., to implement a zoom function in the map, in such a way that first the respective map detail is touched with the finger, and a subsequent change of the setting angle effects a zoom from this detail into the map; alternatively, it is possible to switch between a two-dimensional and a three-dimensional presentation. By rotation of the finger, the map can be rotated.

In CAD programs, components shown on the screen, e.g., can be turned by rotation of the finger, or magnified, demagnified, or zoomed in or out by tilting the finger; rolling the finger can, for example, rotate marked components relative to the screen plane, e.g., about an axis positioned parallel to the screen plane and parallel to the finger resting flat on the screen.

With regard to authentication it is especially useful to fit in more robust security mechanisms, if the fingerprint sensor covers the entire screen surface. If, to be precise, an authentication required only the placement of the fingerprint, as common so far, it could happen that a user inadvertently grants an enable because his finger that is required for authentication selects something else on the screen by chance, while at that moment the authentication prompt appears. For devices with full-surface fingerprint sensors, therefore, it is useful in addition to couple authentication to an unusual security gesture so as to distinguish this procedure from normal, security-irrelevant input procedures of the device. Such security gestures could be, e.g., inputs that, on the one hand, identify the person by the fingerprints of one or several fingers used for the gesture, and, on the other hand, makes it clear—by the kind of placement (static pattern including fingerprint characteristics) or by the kind of movement in a combination with movement patterns—that the user intends to confirm a security-relevant action. Static additional security gestures may, e.g., consist in simultaneously placing the tips of several fingers on the screen, optionally taking diverse fingerprint characteristics into account.

On the whole, the recording and ascertainment of the further fingerprint characteristics, namely, the orientation of the fingers on the screen, the rotation angle and/or the setting angle on the screen, permits the provision of added degrees of freedom; there exist more degrees of freedom per finger that are suitable for associating additional functions. In particular, the analysis of the setting angle and of the rotation angle can be used to execute, with one finger without moving it across the screen, graduated inputs, as e.g., in analog control devices such as rotary switches or slide controls. In contrast to this, prior art predominantly allows only binary inputs with one finger, with which a symbol icon is tapped or not tapped; graduated inputs are made by sliding the control element on the screen, for which always one finger has to be moved. Especially with small screens such as of mobile phones, this involves severe imprecision, whereas the setting angle can be varied irrespective of the screen size, as can the rotation angle. For settings such as those that can be carried out, e.g., with a slide control in a music application, even the analysis of the pressure of a finger on a touch-sensitive screen is too imprecise when the resting force is being ascertained, and scarcely user-friendly if a control procedure extends throughout the duration of the finger contact.

Figure 10:
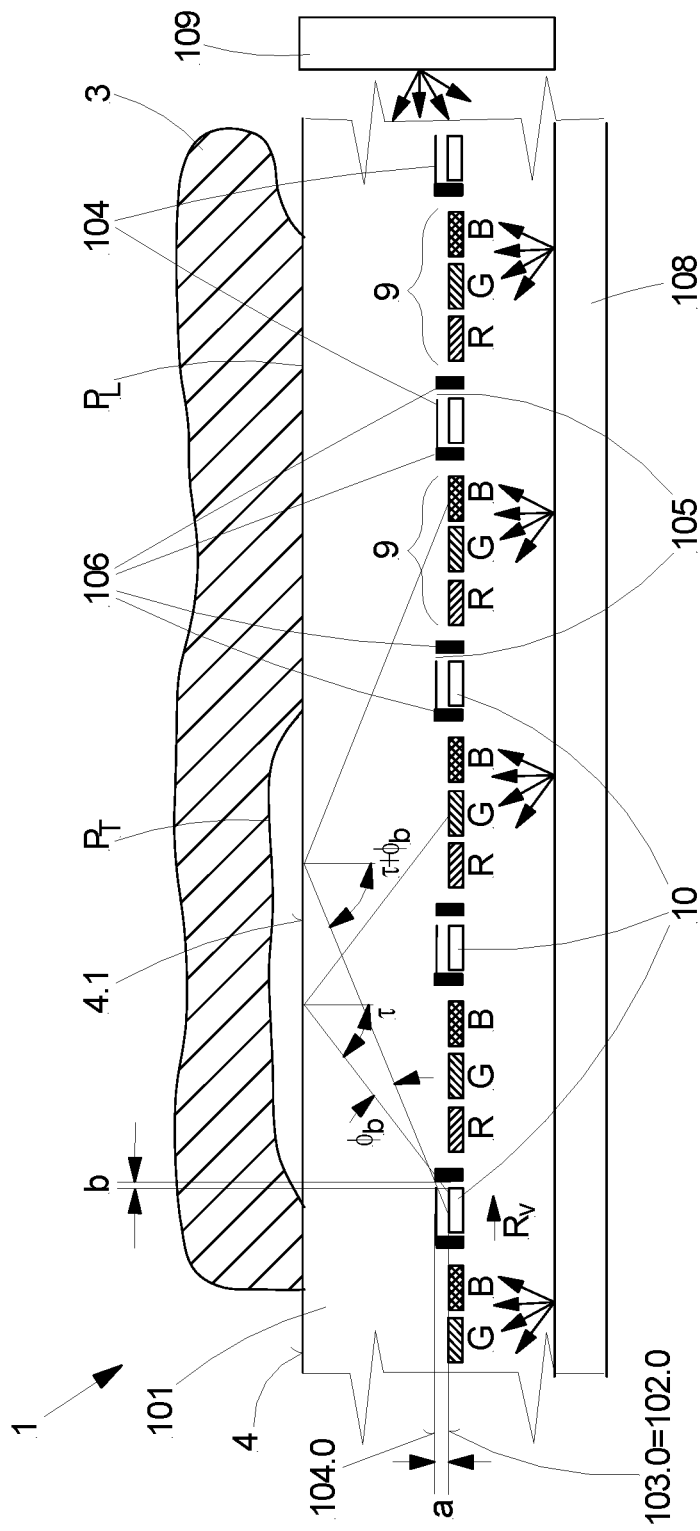
FIG. 10 illustrates another embodiment of a screen in detail.

FIG. 10, finally, is a sketch illustrating the principle of an embodiment of a screen 1 with a first pixel raster of image elements 9 and an integrated second pixel raster of light-sensitive sensor elements 10 for imaging the static pattern, aka papillary structure, of papillary ridges P L and papillary valleys $P_T$ of at least one finger 3, the said screen 1 being applicable in a device for executing the method.

The screen 1 is a single-layer or multilayer transparent or semitransparent body 101 with a resting surface 4, an integrated first pixel raster of image elements 9, 102 in a display plane 102.0, an integrated second pixel raster of light-sensitive sensor elements 10 in a sensor plane 103.0 comprising a multiplicity of such light-sensitive sensor elements 10 and a multiplicity of integrated, regularly arranged angular aperture masks 104 with apertures in an aperture plane 104.0. Herein, the resting surface 4, constituted by an outer surface of the transparent or semitransparent body 101, and at least the sensor plane 103.0 and the aperture plane 104.0 are oriented in parallel with each other. As a rule, the thickness of the screen 1 is between 0.1 mm and 10 mm, preferably between 0.5 mm and 2 mm. Each of the pixel-shaped image elements 9 comprises a number of subpixels R, G, B in the primary colors red, green and blue. The second pixel raster of light-sensitive sensor elements 10 consists of a multiplicity of regularly arranged light-sensitive sensor elements 10, each of which is assigned one of the angular aperture masks 104. The angular aperture masks 104 are configured as planar elements; each of them is provided with an aperture that is so dimensioned and arranged relative to the sensor element 10, strictly speaking, to its light-sensitive surface, that, through this aperture, the sensor element 10 can be obliquely hit only by light reflected at a limited range of reflection angles by the resting surface 4, or at least by one finger 3 resting on it, i.e., only by light reflected by a partial area 4.1 of the resting surface 4, preferably by totally reflected light. For this purpose, the apertures are, in orthogonal direction, in a viewing direction toward the resting surface 4, arranged in front of the sensor element 10 at a distance a, and are, in an offset direction $R_V$ parallel to the resting surface 4, staggered relative to the allocated sensor element 10 in such a manner that, if looked at from a direction orthogonal to the resting surface 4, they are arranged side by side with the sensor element 10, covering this completely. For triggering, reading, and, where applicable, analyzing and computing of records of the second pixel raster of light-sensitive sensor elements 10, these are, or the second pixel raster is, connected to a control and computing unit.

In the embodiment shown in FIG. 10, the display plane 102.0 and the sensor plane 103.0 coincide; that is why the aperture plane 104.0, in the direction of the light reflected by the resting surface 4 is arranged in front of the display plane 102.0. To prevent any stray light or any light directly originating from image elements 9 of the first pixel raster of image elements 9, from hitting the light-sensitive sensor elements 10, the latter are, at a distance a, enclosed by a stray light stop 106, which borders orthogonally on the angular aperture mask 104.

The transparent or semitransparent body 101 can be made of layers of different materials having different refractive indices, in order to adapt the wavelength range, reflection angle or polarization direction of the light to the generation of the record of the at least one finger 3 resting on the screen, and/or, in case of a supplementary light source, to direct the light for illuminating the resting surface 4 onto the said resting surface 4 at incidence angles that, as far as possible, are greater than the critical angle.

The image elements 9, which primarily indicate to the user of the screen 1 optical signals or presentations, may at the same time serve to illuminate the resting surface 4 and, thus, an object placed on it, especially a finger 3. Alternatively or in addition, illumination can be provided by a backlight unit 108, which advantageously directs light of an invisible wavelength range through the first pixel raster of image elements 9 (nested with the second pixel raster of light-sensitive sensor elements 10) to the resting surface 4. Alternatively to the backlight unit 108, a supplementary lighting unit 109 may be provided, which, e.g., also directs to the resting surface 4 light of an invisible wavelength range only, and only at an angle greater than the critical angle. If totally reflected light is to be used for the recording, it is important that the light sources emit light that, at least in part, is incident on the resting surface 4 at angles greater than, or equal to, the critical angle.

The light-sensitive sensor elements 10 can advantageously, as shutter pixels, be provided with an electronic control unit for controlling the exposure time, e.g., as rolling shutters or global shutters, as disclosed in DE 10 2015 116 026 A1. The second pixel raster of light-sensitive sensor elements 10 will then constitute a shutter pixel sensor. With this, the exposure time and, thus, the integration time can be adapted to variations in display brightness caused by the users' application scenarios or varying ambient conditions.

The apertures preferably have a regular form. They may be, e.g., circular, oval, or, even more preferably slit-shaped. In the offset direction $R_V$, the apertures have a maximum width, which in the preferred case of a slit aperture is the slit width b. In the direction orthogonal to the offset direction $R_V$, they have a maximum length, which in the preferred case of a slit aperture is the slit length l, which in FIG. 10 extends perpendicularly to the paper plane and, therefore, is not shown in the drawing.

In a first alternative of the first embodiment of a screen 1 or a device according to the invention, the maximum length or, in the preferred case, the slit length l is smaller than the maximum width or, in the preferred case, than the slit width b. The said maximum length or slit length, respectively, is smaller to such an extent that an isotropic contrast is achieved in a record by means of all light-sensitive sensor elements 10 of the pixel raster of light-sensitive sensor elements 10. In the example shown in FIG. 10, all apertures are offset in the same offset direction $R_V$ relative to the light-sensitive sensor elements 10, although this is not absolutely imperative. Described below are two advantageous configurations of the apertures, both of which can be subsumed under the example shown in FIG. 10, which shows the apertures in a cross section only. According to a first advantageous configuration, the aperture in the angular aperture mask 104 is a rectangular slit 105 that is open toward the edge of the angular aperture mask and delimited by the adjacent stray light stop 106. In a second advantageous configuration, the aperture is an oval or an ellipse. The smaller the maximum length or, in the preferred special case of the aperture being a slit 105, the slit length, the smaller is an acceptance angle $\varphi_l$ (not shown) in the direction of the length. With a constant slit length l, the acceptance angle $\varphi_l$ can, in this direction, be further diminished by arranging the slit 105 in the direction of a plain diagonal, whereas in case of a commonly square light-sensitive sensor element 10 it is arranged in the direction of its slit length l in parallel with a lateral edge of the light-sensitive sensor element 10. This can be of advantage especially if a further reduction of the slit length l is technically unfeasible or involves a lot of extra effort.

Below, the reflection angle range covered and the acceptance angle $\varphi_b$ are explained with regard to the slit width, corresponding to an aperture angle of the sensor elements 10 with angular aperture mask 104 in connection with FIG. 10 on the basis of a sensor element 10 with an angular aperture mask 104 arranged in front of it.

Arranged in front of the first sensor element 10 on the left is an angular aperture mask 104 with a slit 105, the slit width b of which lies in the drawing plane. The reflection angle range, which is defined by the position of the slit 105 relative to the sensor element 10 and by the dimensions of the slit width b and of the sensor element 10—what is meant here is always its light-sensitive surface —, is bounded by peripheral rays, which, together with a perpendicular on the resting surface 4, enclose a first angle η, preferably greater than the critical angle, and a second angle $\tau+\varphi_b$, wherein $\varphi_b$ is the acceptance angle in the direction of the slit width b, which, with a specified size of the sensor element 10, can be set by way of the slit width b and the distance a. Arranged in front of another sensor element 10—not shown in the drawing—can also be an angular aperture mask 104 with a slit 105, the slit length l of which lies in the drawing plane. With a fixed size of the sensor element 10, a given slit length l can be varied somewhat to adjust the acceptance angle $\varphi_l$ in the direction of the slit length.

The acceptance angle $\varphi_b$ in the direction of the slit width b and the acceptance angle $\varphi_l$ in the direction of the slit length l, in connection with the thickness of the transparent body 101 above the aperture plane 104.0, determine the width and the length of the partial surface 4.1, from which light is incident on the respective sensor element 10.

The basic design of a display is independent of the geometric configuration of the sensor elements 10, which favorably have the form of a regular equilateral polygon. The slits 105 of the respective angular aperture masks 104 arranged in front of them are aligned in groups with the slit length l, each in parallel with one side of the sensor elements 10. The sensor elements 10 may also have a different, e.g., round or oval shape.

Taken together, the method and the device disclosed here enable a multiplicity of applications to be controlled more intuitively than it has been possible so far.

LIST OF REFERENCE NUMBERS 1 screen
2 mobile input device
3, 3.1-3.5 fingers
4 resting surface
4.1 partial surface
5 protective layer
6 sensor layer
7 display layer
8 luminous layer
9 image element
10 sensor element
11-14 applications
101 body
102.0 display plane
102.2 transparent region
103.0 sensor plane
104 angular aperture mask
104.0 aperture plane
105 slit
106 stray light stop
108 backlight
109 additional lighting
α orientation angle
β setting angle
γ rotation angle
τ angle $\varphi_b$ acceptance angle
a clearance
b slit width
x, y, z coordinates
F total fingerprint
M static pattern
R, G, B subpixels
$P_L$ papillary ridge (aka friction ridge)
$P_T$ papillary valley
$R_V$ offset direction

What is claimed is:

1. A method for monitoring a mobile input device with a screen on which information can be displayed in a first pixel raster of image elements, and in which a flat optical fingerprint reader is integrated that comprises at least half of a screen surface area of the screen, and a second pixel raster of light-sensitive sensor elements, comprising:
   in an active application for at least one finger placed on the screen, the fingerprint of the finger and several fingerprint characteristics comprising the position of the finger on the screen and optionally a movement pattern of the finger are determined by the fingerprint reader in such a manner that the sensor elements detect a light intensity incident on the sensor elements either once at a specified point of time in one image, or several times during a specified period in a sequence of images,
   the detected intensity values are assembled by an image processing algorithm into a static pattern of the at least one fingerprint and optionally of the movement pattern of the at least one finger,
   the combination of the at least one static pattern, the fingerprint characteristics and optionally the movement pattern is compared with a database,
   when the combination is stored in the database, a check is carried out to determine if, for the active application:
   a. a specified action is associated with that combination, which action is then carried out, or
   b. no action is associated with that combination, whereupon a first standard action is carried out, and,
   if the combination is not stored in the database, a second standard action is carried out, and wherein:
   the second standard action contains sending a signal or a message to a user;
   further fingerprint characteristics are determined, via an orientation by an orientation angle of the at least one finger on the screen, a rotation angle and/or a setting angle of the at least one finger on the screen, and
   the initialization of an authentication process will only take place if the static patterns determined by the fingerprint reader each have at least two specified fingerprint characteristics, and/or if the two static patterns determined at a specified time interval each reflect changes in at least two fingerprint characteristics in a specified way, and/or if the movement patterns determined by the fingerprint reader conform to specified movement patterns.

2. The method as claimed in claim 1, wherein, in the active application, the fingerprints, fingerprint characteristics and, optionally, the movement patterns are determined by the fingerprint reader simultaneously for at least two fingers placed on the screen, and the combination of the at least two static patterns, the fingerprint characteristics and, optionally, the movement patterns is compared with a database.

3. The method as claimed in claim 1, wherein the orientation angle, the setting angle and the rotation angle of a finger are determined in such a manner that first the static pattern of the fingerprint is determined and a check is made as to whether the fingerprint is stored in the database, and, if it is, the orientation angle, the rotation angle and/or the setting angle are calculated by way of a comparison of the static pattern with the fingerprint stored, whereas, with the fingerprint not stored, the rotation angle and/or the setting angle are calculated by way of a comparison with statistical fingerprint characteristics stored in the database.

4. The method as claimed in claim 1, wherein the first pixel raster of image elements is at least partially transparent, and the second pixel raster with sensor elements, seen as looked at by a viewer of the screen, is located below that, or in that the first and the second pixel raster lie in one plane.

5. The method as claimed in claim 1, wherein a layer of angular aperture masks for restricting the angular detection range of the sensor elements is arranged above the sensor elements of the second pixel raster.

6. The method as claimed in claim 1, wherein the image elements are used for illumination during recording of the fingerprints.

7. The method as claimed in claim 1, wherein, for illumination during recording of the fingerprints, light is coupled into a plate-shaped light guide arranged above or below the second pixel raster and featuring large surfaces with light outcoupling elements attached to or formed on them, the light being coupled out via the light outcoupling elements towards a resting surface for the fingers, where the light is totally reflected, unless any papillary ridges of a finger rest on the resting surface.

8. The method as claimed in claim 1, wherein the screen is equipped with a touch-sensitive sensor layer that detects placement of a finger and triggers recording by the fingerprint reader.

9. The method as claimed in claim 1, wherein using the screen as an input device, or using an application or selected functions in an application, is enabled only if the combination of static patterns and at least part of the fingerprint characteristics is stored in the database and connected with an enable function.

10. The method as claimed in claim 1, wherein, for a combination of static patterns, fingerprint characteristics and, optionally, movement patterns, the checking whether a specified action is associated with this combination is preceded by a check whether a first of the at least two static patterns corresponds to a specified activation pattern for activating a multiple fingerprint detection, and wherein the further checking and, optionally, the release of an action takes place only if that is the case.

11. The method as claimed in claim 10, wherein the application is a text input function, and the first of the at least two static patterns corresponds to the activation pattern, characterized in that, according to a second one of the static patterns, either lower-case letters, upper-case letters, numbers or special characters are set as a typing mode.

12. The method as claimed in claim 10, wherein the first of the at least two static patterns corresponds to the activation pattern, wherein, according to a second one of the static patterns, functions of a computer mouse are emulated, wherein one finger each is assigned to a button or a scroll element of the computer mouse.

13. The method as claimed in claim 10, wherein the first of the at least two static patterns corresponds to the activation pattern, wherein, according to a second one of the static patterns, zoom and marking functions are carried out.

14. The method as claimed in claim 10, wherein the first of the at least two static patterns corresponds to the activation pattern, wherein a multiple assignment of an input element by different second ones of the static patterns is implemented, each of which corresponds to a different finger.

15. The method as claimed in claim 10, wherein the first of the at least two static patterns corresponds to the activation pattern, wherein a multiple assignment of an input element is implemented by a second one of the static patterns, wherein the different assignments correspond to different orientations and/or setting angles and/or rotation angles with regard to the fingerprint characteristics.

16. The method as claimed in claim 10, wherein the first of the at least two of the static patterns corresponds to the activation pattern, wherein, according to at least one of the second static patterns, an authentication process is started.

17. The method as claimed in claim 16, wherein the authentication process will only be started if the fingerprint characteristics and/or a movement pattern of the at least one second static pattern correspond to specified values.

18. The method as claimed in claim 1, wherein a change of the setting angle or rotation angle of the at least one finger in the active application changes a sound volume or sets a size of a section of a two- or three-dimensional diagram.

19. The method as claimed in claim 1, wherein a change of the setting angle of the at least one finger in the active application changes between a two-dimensional and a three-dimensional presentation of an object, or changes the setting angle of an actual or emulated writing tool for the screen.

20. The method as claimed in claim 1, wherein a change of the orientation of the at least one finger in the active application rotates an object presented on the screen, or changes the orientation of an actual or emulated writing tool for the screen.

21. A device for carrying out a method for monitoring a mobile input device, comprising a screen with a first pixel raster of image elements, and a second, integrated pixel raster of light-sensitive sensor elements for the optical recording of the static pattern of the papillary ridges of at least one finger, made up of a single-layer or multilayer transparent body with a resting surface, a first integrated pixel raster of image elements in a display plane, a second integrated pixel raster in a sensor plane comprising a multiplicity of light-sensitive sensor elements, and integrated angular aperture masks, each with an aperture in an aperture plane, each angular aperture mask being assigned to a sensor element, wherein:
the aperture plane is disposed between the resting surface and the sensor plane, and the angular aperture masks are arranged so as to completely cover the light-sensitive sensor elements in a direction orthogonal to the resting surface, and
apertures are arranged at an offset in an offset direction ($R_v$) relative to the light-sensitive sensor elements in such a way that through every aperture, only light that is reflected by a partial area of the resting surface will, obliquely from a limited angular range, be incident on the respective light-sensitive sensor element,
the apertures each have a maximum width in the offset direction, and a maximum length in a direction orthogonal to the offset direction, wherein the maximum length is smaller than the maximum width, and
the display plane and the sensor plane coincide, and the angular aperture masks represent individual surface elements, to each of which a stray light stop is assigned, which surrounds the light-sensitive sensor element and orthogonally borders on the angular aperture mask, so that no stray light, nor any light directly emanating from image elements of the first pixel raster of image elements can be incident on the light-sensitive sensor elements.

22. The device as claimed in claim 21, wherein the display plane is disposed between the resting surface and the sensor plane, and the first pixel raster of image elements has transparent regions, through which light reflected off the resting surface is incident on the angular aperture masks arranged below the display plane.

23. The device as claimed in claim 21, wherein the limited angular range is selected in such a manner that only totally reflected light is incident on the sensor elements.

* * * * *